US012189656B1

(12) United States Patent
Willett et al.

(10) Patent No.: US 12,189,656 B1
(45) Date of Patent: Jan. 7, 2025

(54) POINT-IN-TIME RESTORE WITH DELAYED INSTANTIATION

(71) Applicant: Amazon Technologies, Inc., Seattle, WA (US)

(72) Inventors: Dallas Lamont Willett, Albuquerque, NM (US); Prashant Bondada, Bothell, WA (US); Michael G. Rascher, Vancouver (CA); Slawomir Sobon, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 16/201,774

(22) Filed: Nov. 27, 2018

(51) Int. Cl.
*G06F 16/27* (2019.01)
*G06F 11/14* (2006.01)
*G06F 16/23* (2019.01)

(52) U.S. Cl.
CPC ........ *G06F 16/275* (2019.01); *G06F 11/1451* (2013.01); *G06F 11/1469* (2013.01); *G06F 16/2358* (2019.01); *G06F 2201/80* (2013.01); *G06F 2201/805* (2013.01); *G06F 2201/82* (2013.01)

(58) Field of Classification Search
CPC ............... G06F 16/275; G06F 16/2358; G06F 11/1451; G06F 11/1469; G06F 2201/80; G06F 2201/805; G06F 2201/82
USPC ......................................................... 707/613
See application file for complete search history.

(56) References Cited

U.S. PATENT DOCUMENTS

| | | |
|---|---|---|
| 8,990,264 B2 | 3/2015 | Clayton et al. |
| 9,734,021 B1* | 8/2017 | Sanocki ............... H04L 41/0654 |
| 2004/0267835 A1* | 12/2004 | Zwilling ............. G06F 11/1451 |
| 2009/0222812 A1 | 9/2009 | Nissen |
| 2011/0093435 A1* | 4/2011 | Zha ....................... G06F 16/128 |
| | | 711/E12.001 |
| 2014/0108352 A1* | 4/2014 | Ahrens ................. G06F 16/273 |
| | | 707/645 |
| 2014/0351214 A1* | 11/2014 | Abercrombie ........ G06F 16/137 |
| | | 707/626 |
| 2016/0321339 A1* | 11/2016 | Tekade ..................... G06F 8/76 |

(Continued)

FOREIGN PATENT DOCUMENTS

WO 2014013437 A2 1/2014

OTHER PUBLICATIONS

U.S. Appl. No. 16/201,741, filed Nov. 27, 2018.
U.S. Appl. No. 16/201,759, filed Nov. 27, 2018.

*Primary Examiner* — Hosain T Alam
*Assistant Examiner* — Saba Ahmed
(74) *Attorney, Agent, or Firm* — Davis Wright Tremaine LLP

(57) ABSTRACT

A system responds to a request to enable a restoration capability for a first database instance of a first operating environment. The system stores, in the first operating environment, transaction data for the first database instance and data indicative of aspects of the configuration of the first operating environment on which the first database instance is dependent. The transaction data and configuration data are replicated to a second environment. In response to a request to restore the first database instance, a second operating environment is configured according to the replicated configuration data, and the data is restored to a second database instance, in the second operating environment, based on the replicated transaction data.

20 Claims, 6 Drawing Sheets

(56) References Cited

U.S. PATENT DOCUMENTS

2017/0060699 A1\* 3/2017 Hohl ................... G06F 11/1469
2019/0095455 A1\* 3/2019 Barreto ............... G06F 11/1446

\* cited by examiner

POINT-IN-TIME RESTORE WITH DELAYED INSTANTIATION

BACKGROUND

A database management system may rely on failover to improve the availability and reliability characteristics of the system. Failover refers to the automatic or manual switching from a primary database node to a standby database node. For example, if a primary database node fails, a database management system may react to the failure by having a standby node take over the functions previously performed by the primary node.

In such systems, the standby database node operates as a mirror, or replica, of the primary database node. In order to maintain a complete copy of the data maintained by the primary database node, the standby node processes the same transactions processed by the primary node. Typically, the primary database node transmits a record of each transaction it has performed, or is about to perform, to the standby node. The standby node may then process the transaction, thereby keeping its copy of the data up-to-date.

BRIEF DESCRIPTION OF THE DRAWINGS

Various techniques will be described with reference to the drawings, in which.

DETAILED DESCRIPTION

Figure 1:
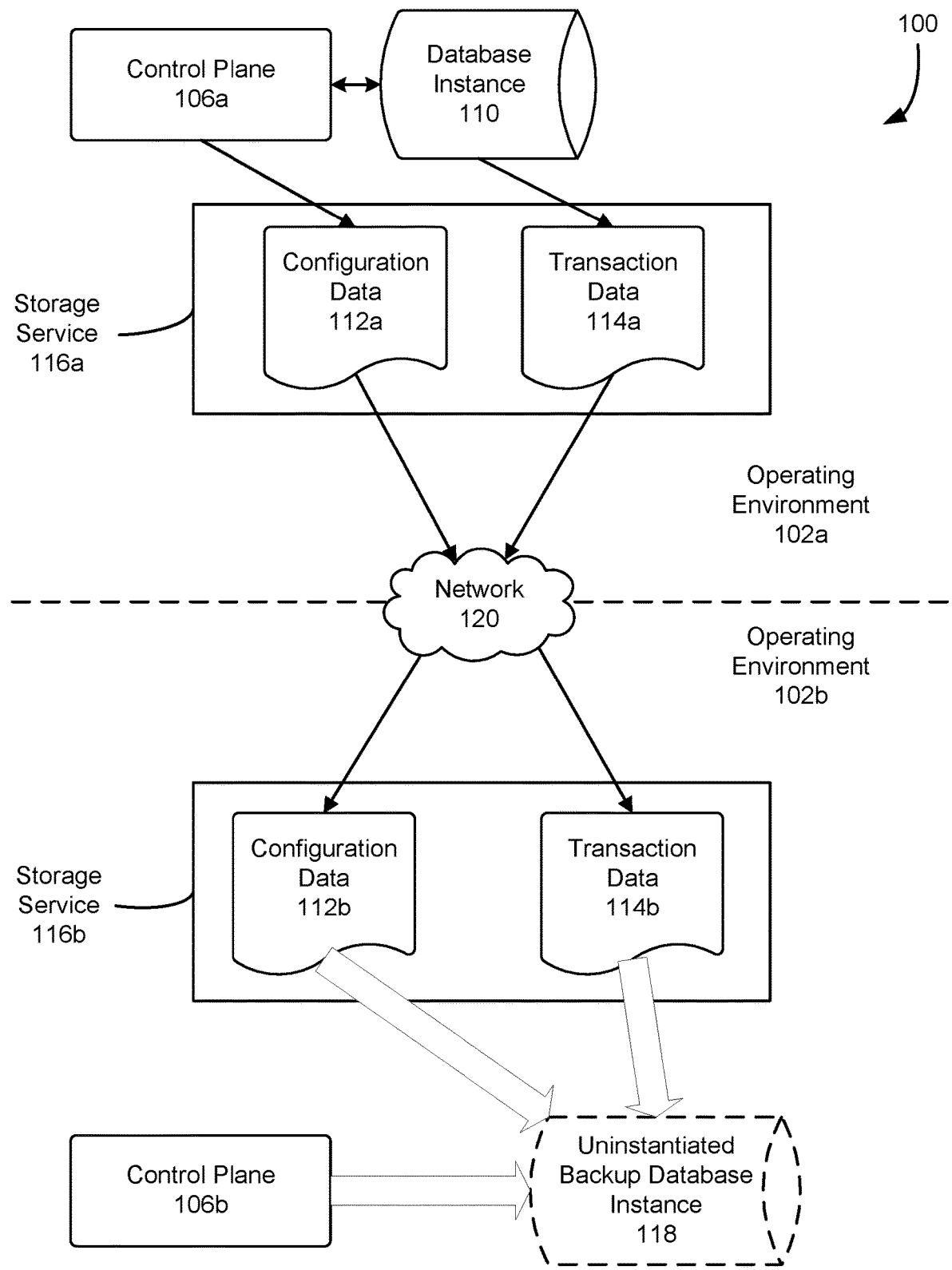
FIG. 1 illustrates a distributed system supporting point-in-time restore with delayed instantiation of a backup database instance, in accordance with an embodiment.

Described herein are systems and methods for enabling a point-in-time restoration capability for a database instance. In an example, a distributed system comprises a control plane and a database instance operating in a first operating environment. In response to obtaining a request to enable a point-in-time restoration capability for the first database, the control plane copies transaction data for the database instance to a storage location in the first operating environment. The control plane also copies data relating to aspects of the configuration of the first operating environment on which the database instance is dependent. The transaction data and configuration data are replicated to a second operating environment. In response to a request to restore the first database, a control plane in the second operating environment configures aspects of the second operating environment corresponding to those on which the first database instance was dependent, based on the replicated data. The second control plane executes an instance of the database in the second operating environment, and restores the data from the original instance by replaying the transactions from the replicated transaction data.

Database management systems may be configured to rely on failover to improve reliability and availability. Typically, such systems have a standby database node configured as a mirror or replica of a primary database node. The primary database node may, for example, transmit a record of each transaction it has performed, or is about to perform, to the standby node. The standby node may then process the transaction in the same manner as the primary node. In the event that the primary node fails, or is taken offline for maintenance, the secondary node thereby has an up-to-date copy of the data and can take over the role of the primary node. However, there are drawbacks to this approach: operating the standby node consumes power and computing capacity, and there may be licensing costs associated with the operation of the standby node. These technical and monetary costs may be incurred even though the standby node may be used only infrequently.

A point-in-time restoration capability refers to the ability to restore the state of the database to a designated point-in-time. For example, if a database instance fails at 11:55 pm, an administrator might determine to restore the database instance so that its data state is current as of 11:54 pm. The administrator might wish to instantiate the database to sometime prior to the failure for a variety of reasons, such as a belief that the cause of the failure was recently introduced. It will be appreciated that this example is intended to be illustrative, and as such should not be construed as limiting.

In an example, a distributed system provides a point-in-time restoration capability without instantiating a standby node. Technical and monetary costs associated with the standby node are therefore avoided. The example distributed system may, for example, begin metering capacity utilized by a restored instance when such an instance is restored. Prior to that point, the technical and monetary costs associated with providing the restoration capability may be less than would be incurred by operating a standby database.

In an example, provision of the point-in-time restoration capability comprises replication between operating environments. The replication involves the transactions processed by the primary database instance, and also involves configuration data. The replicated configuration data can include aspects of the configuration of the operating environment on which the primary database instance is dependent. These aspects include, but are not limited to, configuration settings for the database itself, such as schema of the database, user-defined functions, credentials, and so forth. The replicated configuration data may also include configuration settings that are relevant to clients of the primary database instance. For example, client applications may rely on the database being localized to a particular jurisdiction, or dependent on the database conforming to a particular version of a schema. The replicated configuration data can also include aspects of the operating environment such as network settings, user accounts, virtual machine configurations, and so on.

Replicating the transaction data and configuration data between operating environments facilitates the provision of a point-in-time restoration capability. An operating environment refers to a combination of components and devices, connected by a network, which collectively perform a computing function. Operating environments may be isolated from each other in a manner that reduces the risk that a failure in one operating environment would be repeated in another. For example, a power failure in one operating environment is not likely to affect another operating environment in a distant geographic location. This example should not, however, be viewed as limiting the scope of the present disclosure to only those embodiments in which operating environments are located at different geographic locations.

In an example, replication of the transaction and configuration data is accomplished via the use of a distributed storage service, which may also be referred to herein as a storage service. A distributed storage service comprises computing devices and components that, collectively, provide scalable storage infrastructure. A distributed storage service may further provide replication features suitable to replicate transaction and configuration data between locations accessible to a source operating environment, in which a primary database instance executes, and a target operating environment, in which the primary database instance may, upon request, be restored.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. In some embodiments, the computing capacity consumed to provide a point-in-time restore capability is reduced. In some embodiments, the technical and monetary costs of maintaining an operational standby database are reduced or eliminated. In some embodiments, greater flexibility regarding the location of a restored database is provided.

Figure 6:
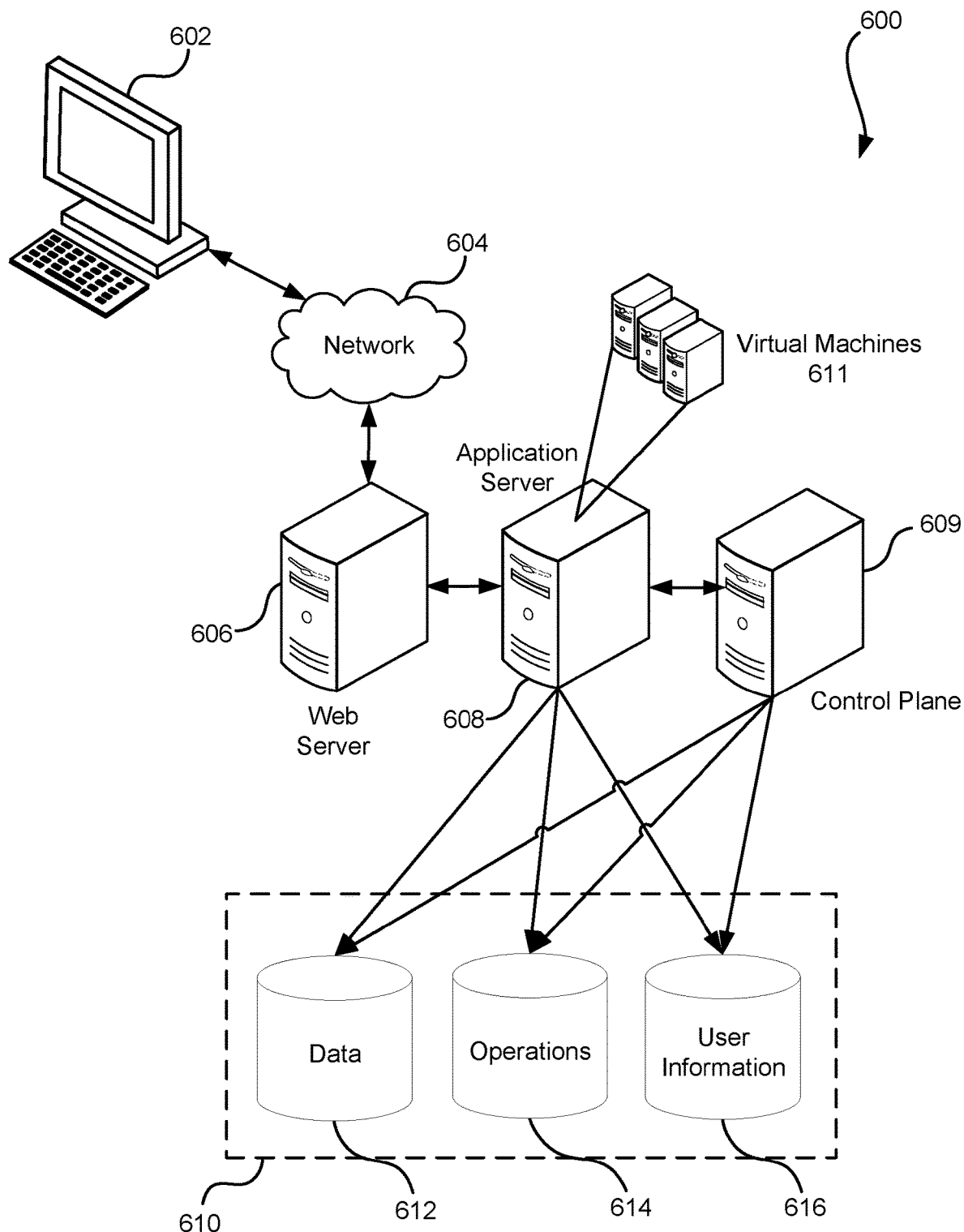
FIG. 6 illustrates a system in which various embodiments can be implemented.

FIG. 1 illustrates a distributed system 100 supporting point-in-time restore with delayed instantiation of a backup database instance, in accordance with an embodiment. In the example distributed system 100, a database instance 110 is operative in a first operating environment 102a, and can be restored by the distributed system 100 in a second operating environment 102b. An operating environment refers to a combination of components and devices, connected via a network, which collectively perform a computing function. As depicted in FIG. 1, operating environments 102a, 102b may be isolated from each other. For example, the components and devices in operating environment 102a as shown below may be in geographic proximity with each other, for example at the same data center. The components within the operating environment 102a may be connected by a communications network that is relatively high-speed compared to the network 120 that connects the two depicted operating environments 102a, 102b. FIG. 6 depicts further aspects of an operating environment.

The operating environments 102a,b may, in some cases and embodiments, correspond to operating regions of the distributed system 100. For example, the components and devices of a first operating environment 102a may be located in a first geographic region, and the components and devices of a second operating environment 102b may be located in a second geographic region. The operating environments may be connected by a network 120, which may include any of various communications networks, including but not limited to the Internet, wide-area networks, mesh networks, fiber optic networks, wireless networks, satellite-based networks, powerline networks, and so on, individually and in various combinations.

Note that although FIG. 1 depicts only a first operating environment 102a and a second operating environment 102b, other cases and embodiments may involve more than two operating environments. For example, in one example, a database instance is initially created in the first operating environment. The database instance is then instantiated in a plurality of operating environments, such as those similar to the depicted second operating environment 102b. In some embodiments, multiple database instances may be restored to the same operating environment. In some embodiments, the database instance can be restored multiple times, each to a different point-in-time.

In the example system 100, control planes 106a,b perform operations to coordinate the activities and operation of components within their respective operating environments 102a,b. In an embodiment, a control plane 106 comprises a module installed on an application server, such as the control plane and application server depicted by FIG. 6. A module, as used herein, refers to processor-executable instructions stored in a non-transitory memory of a computing device. The instructions, when executed by at least one processor of the computing device, cause the computing device to perform at least the described operations of the module.

Examples of operations performed by a control plane 106 include configuring networks within an operating environment 102, allocating and configuring hardware devices, including computing devices, allocating and configuring virtual machines, installing software on the virtual machines, and so forth.

A control plane 106a in the first operating environment 102a controls and monitors execution of a database instance 110. The database instance 110 is in the same operating environment 102a as the control plane 106a. The controlling and monitoring may comprise monitoring and record information about the configuration of the database instance 110. This can include information about the storage devices used by the database, database account information, and so on.

The control plane 106a may also control and monitor the operating environment 102a for changes to aspects of the configuration of the operating environment. The control plane 106a may monitor and record information concerning aspect of the operating environment 102a on which the database instance 110 depends. Examples of configuration information which might be monitored and recorded include, but is not limited to, routing tables, domain name service entries, virtual private network settings, encryption keys, and so on.

In the example illustrated by FIG. 1, the control plane 106a receives a request to enable a point-in-time restoration capability for the database instance 110. A point-in-time restoration capability refers to an ability to restore a database instance such that the data managed by the restored database instance is up-to-date as of an indicated time. For example, if the database instance 110 were to crash, a client might request that the database instance 110 be restored with data that was current as of the time of the crash. Having a point-in-time restoration capability does not necessarily require that all data from the initial database instance 110 be available. However, the distributed system 100 may ensure that a point-in-time restoration will likely be able to restore all relevant data within a threshold range of a requested time, so that the restored database instance can effectively act as a replica or replacement of the original database instance.

In the example distributed system 100, point-in-time capability is provided without a live backup instance. The backup instance 118 is may therefore remain uninstantiated until a point-in-time restoration is requested. This approach reduces the costs of providing the point-in-time restoration capability, in both technical and monetary aspects. For example, prior to a restoration, no processors need to be allocated for executing a backup database instance, or processing transactions. Database licensing costs may also be reduced, since in distributed system 100 the backup database is not instantiated unless a restoration is requested. Instantiation refers to the process of creating the database instance. An instantiated database instance is therefore a database instance that has been created or made operational.

The control plane 106a responds to the request to enable point-in-time restore capabilities by causing configuration data 112a and transaction data 114a to be written to a storage location. In the example of FIG. 1, the control plane 106a causes the configuration data 112a and transaction data 114a to be written to the storage service 116a.

The configuration data 112a comprises data pertaining to or describing the operating environment 102a and the database instance 110, particularly data relating to configuration of the operating environment 102a, include the configuration of the database instance 110. For example, the configuration data 112a can include details about the configuration of the operating environment 102a on which the database instance 110 depends. Examples of configuration data include, but are not limited to, virtual machine images, database snapshots, user credentials, account credentials, digital certificates, network settings, virtual private network ("VPN") settings, operating system patches, registry entries, and so on. Further examples include storage device settings, storage service properties, database schemas, and so on. In general, the configuration data 112a includes any information that is to be restored in the event that a backup instance 118 were to be instantiated. This may include whatever settings might be desired or needed to ensure that the backup database instance 118 can operate effectively as a replacement for the primary database instance 110.

The transaction data 114a comprises records of transactions performed by the database instance 110. The transaction data 114a may include a transaction log. A transaction log is a record of the operations performed by a database. Typically, a transaction log is ordered by the time at which the operations were performed. A transaction log can be replayed to a database. When a transaction log is replayed, the transactions recorded it are processed by the database. Accordingly, replaying a transaction log can restore data to a database. The transaction data 114a can also include a snapshot of the database. The transaction data 114a,b may also include, in some cases and embodiments, baselines, snapshots, or image files of data stored in the database instance. For example, the transaction data 114a,b might include a baseline of an object, and might also include records of transactions performed on the object subsequent to the baseline. Together, the baseline, snapshot, or image file represent the current state of the object. By replaying transaction data up to a point-in-time, the state of the object can be reconstructed up to that point-in-time. A baseline, snapshot, or image file may contain both transaction data and configuration data.

In an embodiment, the control plane 106a causes at least some data from the transaction log of the database instance 110 to be written to the storage service 116a. The data written to the storage service 116a can make up at least part of the depicted transaction data 114a. This transaction data 114a can include records of transactions subsequent to a snapshot of the database instance 110. Although not explicitly illustrated in FIG. 1, the control plane 106 may also cause a snapshot of the database instance 110 to be written to the storage service. Here, the snapshot refers to a baseline version of the collection of data that is managed by the database instance 110. Snapshot data can also make up part of the transaction data 114a. Together, the transaction data 114a and the snapshot can be used, as described herein, to reconstruct the data state of the database instance 110 at a requested point in time.

Figure 2:
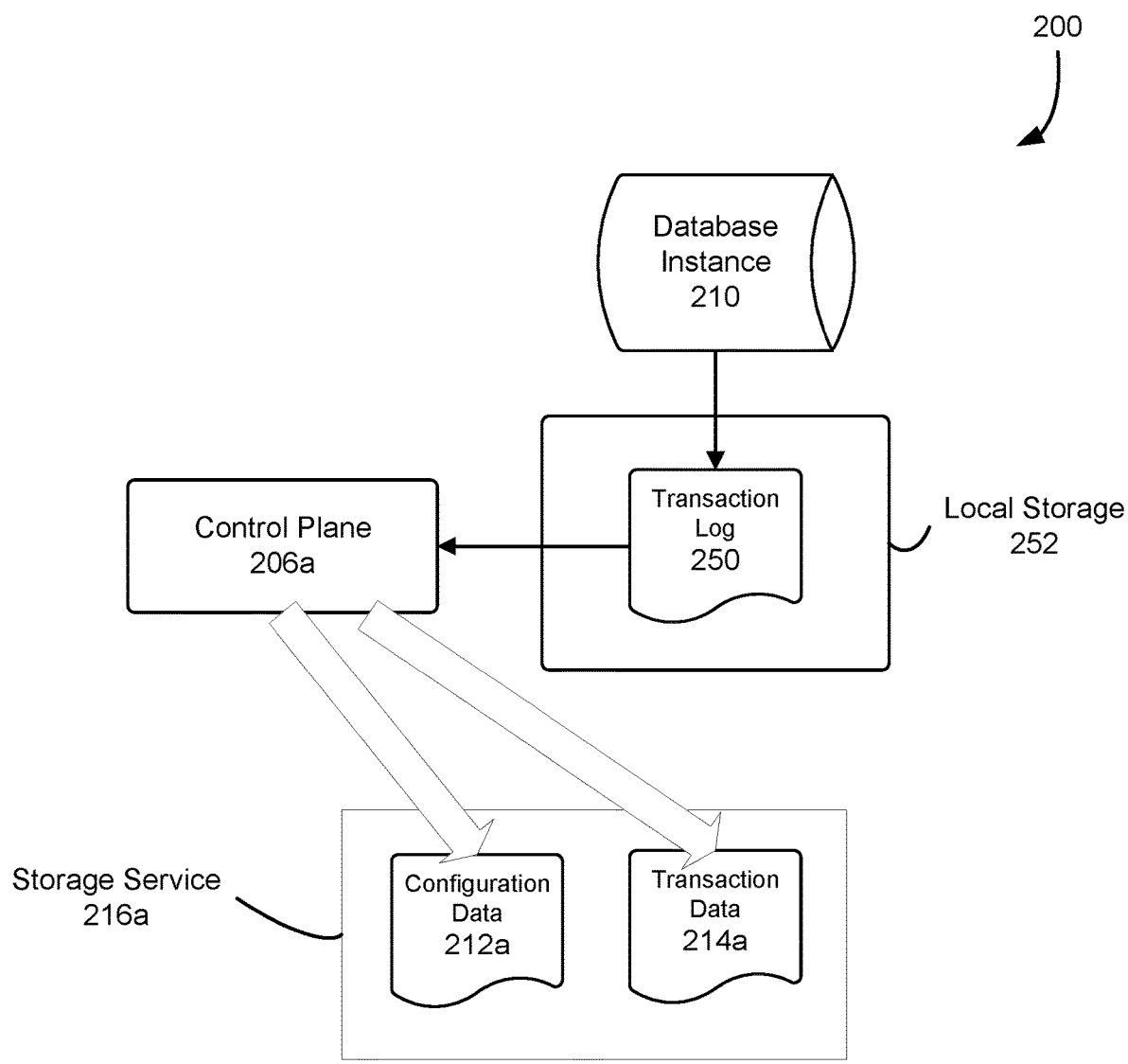
FIG. 2 illustrates aspects of data storage in a distributed database system with support for point-in-time restoration with delayed instantiation of a backup database instance, in accordance with an embodiment.

In some instances, the database instance 110 writes data to a storage device that is not replicated. In such instances, the control plane 106a reads the transaction data 114a from this storage device and sends it to the storage service 116a. This process is ongoing once started in response to the request to enable a point-in-time restore capability. FIG. 2 provides describes further aspects of copying and replicating the transaction data 114a.

In an embodiment, the storage service 116a is independent of the operation of the database instance 110, and possibly independent of the operating environment 102a. For example, the storage service 116a might, instead of being part of the operating environment 102a, be an Internet-based storage service that is accessible to the control plane 106a in the operating environment 102a.

In an embodiment, the storage service 116a comprises scalable infrastructure for data storage. For example, a storage service 116a can comprise a control plane that is similar though not necessarily identical to the control plane 106a, a plurality of application servers such as the application server depicted in FIG. 6, and a plurality of storage devices.

The storage service 116a is accessible to other components and devices within the operating environment 102a, and is also connected via the network 120 to a comparable storage service 116b in another operating environment 102b. The data stored by the storage service, e.g., the configuration data 112a and transaction data 114a, is therefore accessible to both the control plane 106a in the first operating environment 102a and the control plane 106b in the second operating environment 102b.

Data maintained in the storage service 116a of the first operating environment 102a is replicated to the storage service 116b in the second operating environment 102b. In some embodiments, the replication is performed by the storage services 116, using replication modules operative as components of the storage services 116 within each respective operating environment 102. The replication modules, which may be operative on an application server such as those depicted in FIG. 6, communicate with each other via the network 120. The replication module in the first operating environment 102a reads data from storage devices of the storage service 116a and transmit the data to the replication module in the other operating environment 102b. There, the replication module in the second operating environment 102b stores the data on storage on devices of the storage service 116b in the second operating environment 102b.

Although not explicitly depicted in FIG. 1, some embodiments may utilize replication modules similar to those just described, but which operate independently of the respective storage services 116 in the operating environments 102. In such embodiments, a replication module in the first operating environment 102a transmits data from the storage service 116a in the first operating environment to the replication module in the second operating environment 102b. The replication module in the second operating environment 102b then causes the received data to be stored by the storage service 116b in the second operating environment.

Although not explicitly depicted in FIG. 1, in some cases a plurality of storage devices may be used in place of the respective storage services 116 in each of the operating environments 102. In such cases, a control plane coordinates utilization of the storage devices, and a replication module in the first operating environment 102a transmits data to a replication module in the other operating environment 102b.

The replicated data can comprise the configuration data 112b and transaction data 114b. A snapshot of the database can also be replicated to the second operating environment 102b. Regardless of whether the replication is done by the storage services 116 or done independently, these components may be replicated independently of the operation of the database instance 110. It may, however, be advisable to tune the speed of replication in accordance with target times for restoration. Lag in the replication process may delay instantiation and restoration of a backup database instance, or limit how-up-to-date the point-in time restoration can be.

A control plane 106b in the second operating environment may receive a request to restore the database instance 110. In general terms, the restoration process involves the various steps and/or operations needed to instantiate a backup database instance 118, and to restore the data maintained by the primary database instance 110. As described above, the backup instance 118 is not instantiated until such a request is received. As such, it may be the case that the only technical costs associated with the provision of the point-in-time restore capability are those costs associated with storage and data replication. Here, costs refer primarily to the consumption of computing or other technical resources.

The control plane 106b may receive the request to restore the database instance 110 from a control plane 106a in the other operating environment 102a, or from a message triggered by a user interface or application programming interface ("API"). Although not explicitly depicted in FIG. 1, a user interface or API may be provided to allow for the submission of a request to enable point-in-time restore capabilities, and to allow for the submission of a request to initiate a restoration process. The user interface may communicate these instructions to control plane 106a or control plane 106b. Note that the capabilities and functioning of the user interface, particularly with respect to requesting that a database instance be restored, should be available to a client even in cases where the first operating environment 102a is unavailable. Thus, in at least some embodiments, the control plane 106b can receive a request to restore a database instance even when the first operating environment 102a is unavailable.

In response to the request to restore the database instance 110, the control plane 106b in the second operating environment performs operations to configure the operating environment 102b to support the backup database instance 118, installing and activating the backup database instance 118 on a virtual machine, configuring the backup database instance 118, obtaining database snapshots (if available), and replaying the transactions data 114b to restore the data state of the primary database instance 110 to the backup database instance 118. These steps are described in more detail regarding FIG. 4.

Note that although the term restore is used with respect to the process for instantiating the database instance 110, there may be cases where the database instance 110 remains available and/or operative after the backup database instance is instantiated. Thus, the term restoration does not necessarily imply that the primary database instance 110 has failed, been interrupted, or has ceased to exist. Instead, the term restore refers to creating a copy of the primary instance, with data that is current up to an indicated point in time, regardless of the current state of the primary database instance 110.

As used herein, a database instance refers to a module for performing the functions of a database and a collection of data on which the module performs those functions. In various embodiments, the collection of data is owned either by a single entity, or by a single tenant of a multi-tenant database system. A multi-tenant database system is one in which data owned by a number of entities is managed by a single database, or by a plurality of databases which are collectively managed and owned by a plurality of entities. In the case of a multi-tenant database, a database instance generally refers to the module and the collection of data owned by a particular tenant, or to a set of tenants for whom a point-in-time restore capability is being enabled.

FIG. 2 illustrates aspects of data storage in a distributed system with support for point-in-time restoration with delayed instantiation of a backup database instance, in accordance with an embodiment. In particular, the depicted example 200 relates to embodiments which employ a local storage 252 and transaction log 250 of the database instance 210. The database instance 210, control plane 206a, configuration data 212a, transaction data 214a, and storage service 216a may correspond to the database instance 110, control plane 106a, configuration data 112a, transaction data 114a, and storage service 116a of FIG. 1.

In the example 200 of FIG. 2, a database instance 210 writes data to a transaction log 250. The transaction log 250 is a record of operations requested to be performed by the database instance 210. For example, for a given collection of data, the transaction log 250 may contain a record of all requested insert, edit, and delete operations pertaining to the collection of data. These records may be written to the transaction log, and then performed by the database. In this way, it can be assured that once written to the transaction log, the requested operations can be subsequently applied to the collection even if the database instance 210 were to fail. Moreover, the entries can be replayed to restore the database instance to a known state. For example, the records in the transaction log 250 may be stored with an indication of a time associated with the requested operation. By replaying these operations up to an indicated time, the state of the database as of the indicated time can be restored. This may be referred to as a point-in-time restoration of the data state.

In the example 200 of FIG. 2, the database instance 210 writes the transaction log 250 to local storage 252. The local storage 252 may comprise one or more storage devices on the same computing device as the database instance 210. Alternatively the local storage 252 may comprise one or more storage devices connected by a network to the computing device(s) on which the database instance 210 operates. Examples of the storage devices of which the local storage 252 may be comprised include solid-state drives, mechanical disk drives, memory-based storage systems, and so on.

The control plane 206a causes data from the transaction log 250 to be written to the storage service 216a. This data is represented in FIG. 2 as transaction data 214a. This may be accomplished in a number of ways.

In an embodiment, the control plane 206a copies one or more of the files of the transaction log 250. Although depicted as a single element in FIG. 2, the transaction log 250 may comprise a number of files. For example, the transaction log 250 might be made up of a series of files segmented by time. In some cases and embodiments, the files might also be segmented by collection of data, or by tenant.

In an embodiment, the control plane 206a scans identities and/or contents of the file(s) that make up the transaction log 250 to identify files or records to copy to the transaction data 214a on the storage service 216a. The files or records to copy may be identified based on one or more of the following factors, individually or in combination. One factor is whether or not point-in-time restoration has been enabled for the collection of data to which the record pertains. A second factor is the time associated with the record, and whether or not backup baseline, backup, or image file of the database is available in another region subsequent to that time. A transaction log record is generally not needed for a point-in-time restoration if the change it represents has already been incorporated into a baseline that is available to the restoration process.

In an embodiment, the control plane 206a leverages snapshot capabilities of the local storage 252. For example, local storage 252 may have capabilities permitting it to quickly record snapshots of the files it stores. These may be obtained and copied to the storage service 216a.

The control plane 206a also causes configuration data 212a to be written to the storage service 216a. This may also be accomplished in a variety of ways.

In an embodiment, configuration changes to the operating environment are made by or routed through the control plane 206a and recorded in a log of changes. The control plane 206a can then send the log of configuration changes to the storage service 216a. The storage service 216a, in response, can store the log of configuration changes and replicate the log to another operating environment. Once replicated, the control plane in the other operating environment can apply the changes to that environment. The control plane might apply some changes immediately, or soon after receiving them. However, it might also be the case that no such changes are applied until and if a backup instance is restored in the target operating environment.

In an embodiment, configuration changes to the operating environment are made by other components, but monitored by the control plane 206a. For example, the control plane 206a might receive notifications of configuration changes. These can then be added to a log of configuration changes and provided to the storage service 216a, which can then store the log and replicate it to other operating environments.

In an embodiment, configuration changes are recorded in baselines or snapshots. For example, a snapshot of the database instance 210 might contain configuration data such as operating parameters, user-defined functions, schema, linked databases, and so on. It will be appreciated that these examples are intended to be illustrative, and should not be construed so as to limit the scope of the present disclosure to only the specific examples provided.

In another example, configuration data may be captured in snapshots of virtual machines. For example, an image of a virtual machine, which may also be described as a snapshot or baseline of a virtual machine, might contain configuration data for that virtual machine. Examples of such configuration include the virtual machines networking configuration, installed applications, user accounts, and so on. It will be appreciated that these examples are intended to be illustrative, and should not be construed so as to limit the scope of the present disclosure to only the specific examples provided.

The control plane 206a may copy configuration data, including when applicable the aforementioned snapshots, images, or baselines, to the storage service 216a. The storage service 216a may then proceed to replicate the information to other operating environments.

Figure 3:
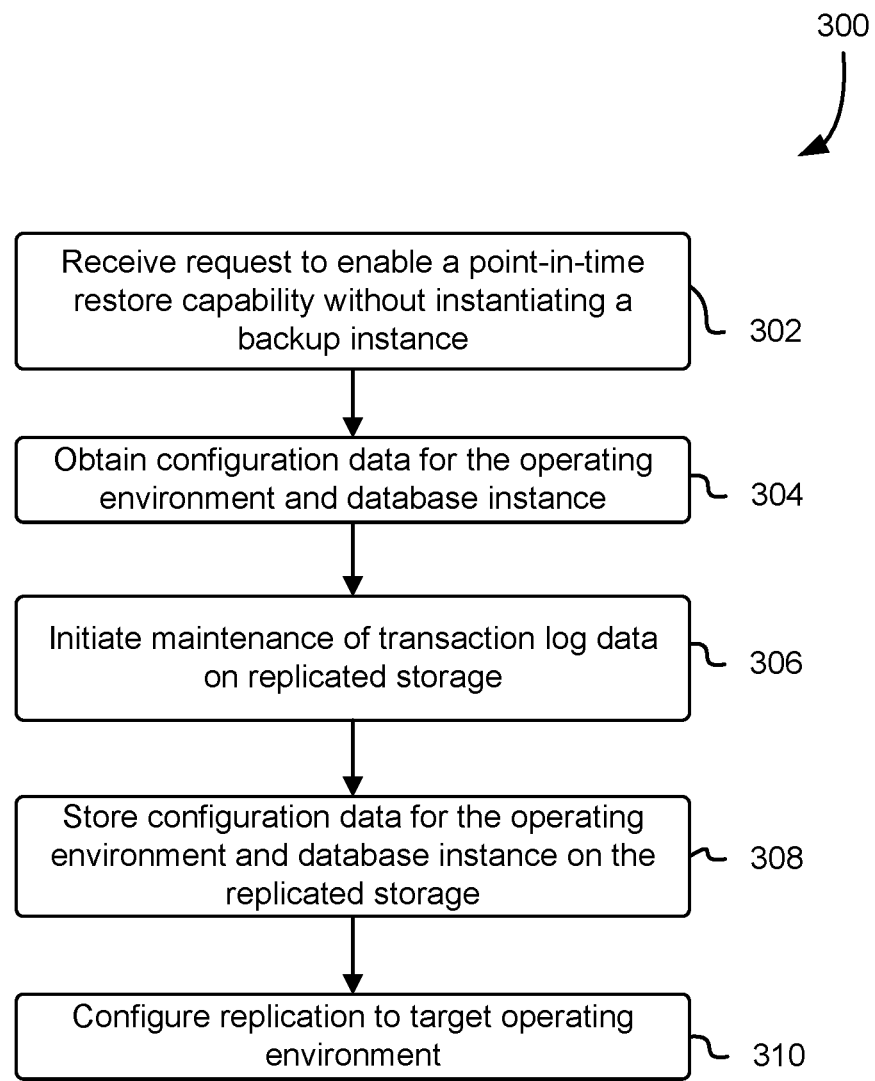
FIG. 3 is a flow diagram illustrating an example process for enabling a point-in-time database restoration capability, with delayed instantiating of the backup instance, in accordance with an embodiment.

FIG. 3 is a flow diagram illustrating an example process 300 for enabling a point-in-time database restoration capability, with delayed instantiating of the backup instance, in accordance with an embodiment. Although FIG. 3 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 300 may be performed by a distributed system, such as the data distributed system 100 depicted in FIG. 1. In some embodiments, the depicted steps are performed or initiated by a control plane of the distributed system 100, such as the control plane 106a depicted in FIG. 1.

At 302, the control plane receives or otherwise obtains a request to enable a point-in-time restoration capability for a database instance, where the restoration capability is enabled without instantiating a backup instance. A backup instance refers to a node or instance of the database, such as a read replica of a database that processes the same transactions as the database instance, or a subset thereof. Instantiating the backup instance refers to executing the instance.

As a consequence of not immediately instantiating the backup instance, the technical and monetary costs associated with executing such an instance is not incurred until and if such an instance is needed. However, deferring the instantiation raises a number of technical challenges, which in an embodiment are addressed as described with respect to FIG. 3.

At 304, the control plane obtains configuration data for the operating environment and database instance. The operating environment refers to the operating environment in which the database instance is executing, or alternatively the operating environment in which the primary database instance will execute, in cases where restoration capability is requested when the database instance is initially configured.

In an embodiment, the control plane obtains configuration data by recording snapshots of the database instance and of the computing device and/or virtual machine on which the database instance executes.

In an embodiment, the control plane obtains configuration data by monitoring changes made to the operating environment. For example, configuration changes to the operating environment may be routed through the control plane. The control plane can then store records of the configuration changes. In some instances, the control plane may initiate or facilitate configuration changes, and can record them.

In an embodiment, the control plane maintains metadata indicative of configuration aspects on which the database is dependent. For example, the control plane may store metadata indicative of configuration changes that have been made by or routed through the control plane. The metadata may further indicate which of these changes are pertinent to the operation of the database, and on which the database may therefore be considered dependent. The metadata might also provide means of identifying relevant configuration changes to an operating system or database configuration.

At 306, the control plane initiates maintenance of transaction log data on replicated storage. In this step, initiating maintenance refers to an ongoing basis to copy transaction data to a replicated storage location, such as a storage service accessible to the operating environment in which the original database instance is executing.

In an embodiment, the control plane initiates maintenance of the transaction data by launching a thread or executable process which copies transaction data to a replicated storage location, such as a storage service with replication features. In an embodiment, the control plane monitors the transaction log of a database instance for new entries, and copies the new entries to replicated storage. In another embodiment, the control plane monitors a directory or other storage location for new transaction log files, and copies the new files to replicated storage. Alternatively, the thread or process may periodically copy a transaction log, or a portion thereof, to replicated storage.

The replicated storage refers to a storage service that has replication features, including the ability to generate and store a copy of the files or other data stored on the service. For example, storage service with replication features may automatically store copies of data in at least two geographic regions. The transaction data copied to the replicated storage is therefore replicated in accordance with the replication features of the service. Alternatively, the replicated storage refers to a storage system or storage device that is replicated to another operating environment by the operating of control planes in the respective environments.

At 308, the control plane stores the configuration data for the operating environment and database instance on the replicated storage. This information may then be replicated to another location for use in a restoration of the primary database instance.

At 310, the control plane configures replication to the target operating environment. When a client requests that a restoration capability be enabled, they may also specify one or more target operating environments. A target environment refers to an environment in which the database might be restored. For example, if the primary database instance operates in an operating environment geographically located on the West Coast, a target environment for restoring the database might be specified as the East Coast. This step may be optional, in the sense that the storage service may have replication features do not require such configuration. Also note that the replication may not always be to the target operating environment, but rather to a location that is accessible to the target operating environment.

Embodiments may configure the features of replication in accordance with requested attributes of the restoration. An example of such an attribute is latency of replication, since the ability to restore a database instance may depend on how long the data takes to replicate to the operating environment in which the database is to be restored. In some cases, replicating the data to the target environment helps to minimize the time needed to restore the database, since the transaction data and configuration data will have been transferred to the target operating environment prior to the restoration request.

Another aspect of replication involves ownership of the replicated data. Ownership refers to the account, or accounts, that can read or modify the replicated data. In an embodiment, the replication is configured to associate the replicated data with the same account used in conjunction with the primary database instance in the original operating environment. In another aspect, the replicated data is associated with another account that is used only in a target environment. In another aspect, the replicated data cannot be modified or deleted (but may be accessed) without approval from both accounts.

Figure 4:
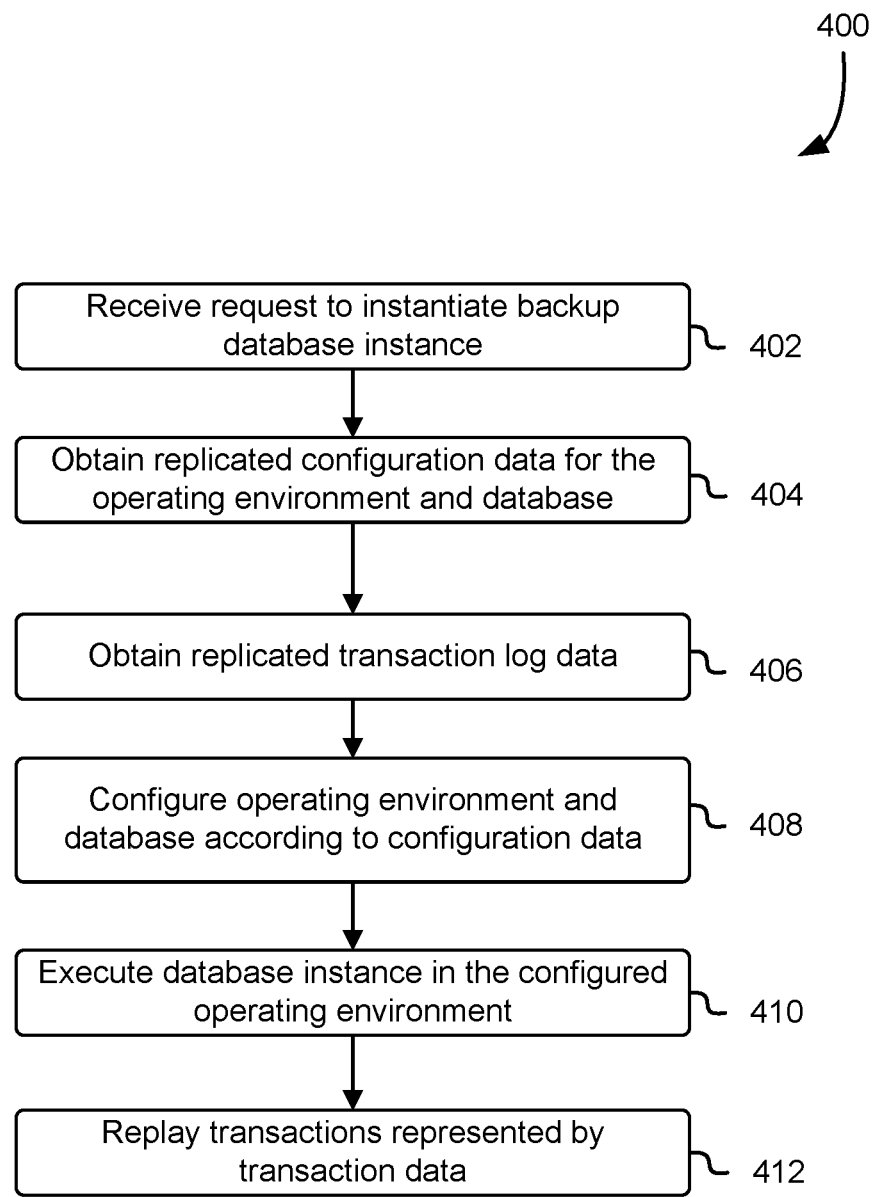
FIG. 4 is a flow diagram illustrating an example process for performing a point-in-time database restoration, in accordance with an embodiment.

FIG. 4 is a flow diagram illustrating an example process 400 for performing a point-in-time database restoration, in accordance with an embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 400 may be performed by a distributed system, such as the distributed system 100 depicted in FIG. 1. In some embodiments, the depicted steps are performed or initiated by a control plane of the distributed system 100, such as the control plane 106*a* depicted in FIG. 1.

At 402, the distributed system receives a request to instantiate a backup database instance. As noted, the instantiation of the backup database instance occurs when the restoration is requested, rather than when the client requests that the restoration capability be enabled. A control plane in an active operating environment may receive the request. If not in the target operating environment, the control plane that received the request may then forward it to the control plane in the target operating environment.

In an embodiment, metering the capacity utilized for executing the restored instance is initiated in response to receiving the request to instantiate the backup instance, e.g., once the backup instance has become operable. Prior to the request, no such costs are associated with the backup instance. There may, however, be costs associated with monitoring, storing, and replicating transaction data and configuration data. The metering may be initiated by the control plane after receiving the request and completing the instantiation of the restored instance. The control plane may, for example, begin collecting data pertaining to how much data is read from or written to the restored database instance, and store records associating those activities with a corresponding account.

At 404, the distributed system obtains the replicated configuration data for the operating environment and database. In an embodiment, a control plane operating in a second operating environment obtains configuration data for a first operating environment. In an embodiment, the control plane identifies data relevant to the database instance (for example, based on account information, a database instance identifier, an operating environment identifier, and so forth) and retrieves the corresponding configuration information from a storage device or service accessible in the second operating environment. The information may be included in the received request to restore the database instance. Once identified based on this information, the data can be retrieved from a storage location accessible to the second operating environment.

At 406, the distributed system obtains the replicated transaction data. In an embodiment, the control plane in the target operating environment retrieves the transaction data from a storage service. On the storage service, the transaction data is identified based on a naming pattern or identification system that incorporates information such as account number, database instance identifier, operating environment identifier, and so forth. The information that identifies the transaction data may be included in the request to restore the database instance.

At 408, the distributed system configures the operating environment and database according the obtained configuration data. In an embodiment, this is done via a control plane in the second operating environment. For example, the configuration information may be structured as a collection of configuration logs and snapshots. The configuration logs may describe a series of changes made to the first operating environment. The logs may include information indicating when the configuration changes were made. The snapshot information can include database snapshots, virtual machine snapshots, and so forth, and may be associated with information indicating when the snapshots were taken. Using the time information, the control plane may apply relevant configuration changes up to the desired time for the point-in-time restoration. Similarly, snapshots current as of the indicated restoration time may also be used. In this manner, the configuration of the first operating environment can be recreated in the second operating environment, to the extent necessary to allow the restored database to run in the second environment.

At 410, the distributed system executes the new database instance in the target operating environment. This may be done via inter-process communication between the control plane in the target environment and the operating system of the computing device or virtual machine on which the database instance is to be executed on.

At 412, the distributed system replays the transactions that are represented by the transaction data. Replaying the transaction data may refer to causing the new database instance to process the transactions represented by entries in the transaction data. It may also involve incorporating baseline data prior to processing transactions which occurred subsequent to the baseline. In an embodiment, the control plane initiates the replaying by sending a command to the new database instance. The command indicates that the database instance should replay entries in a transaction data, and provides a location where the database instance can access the entries.

Figure 5:
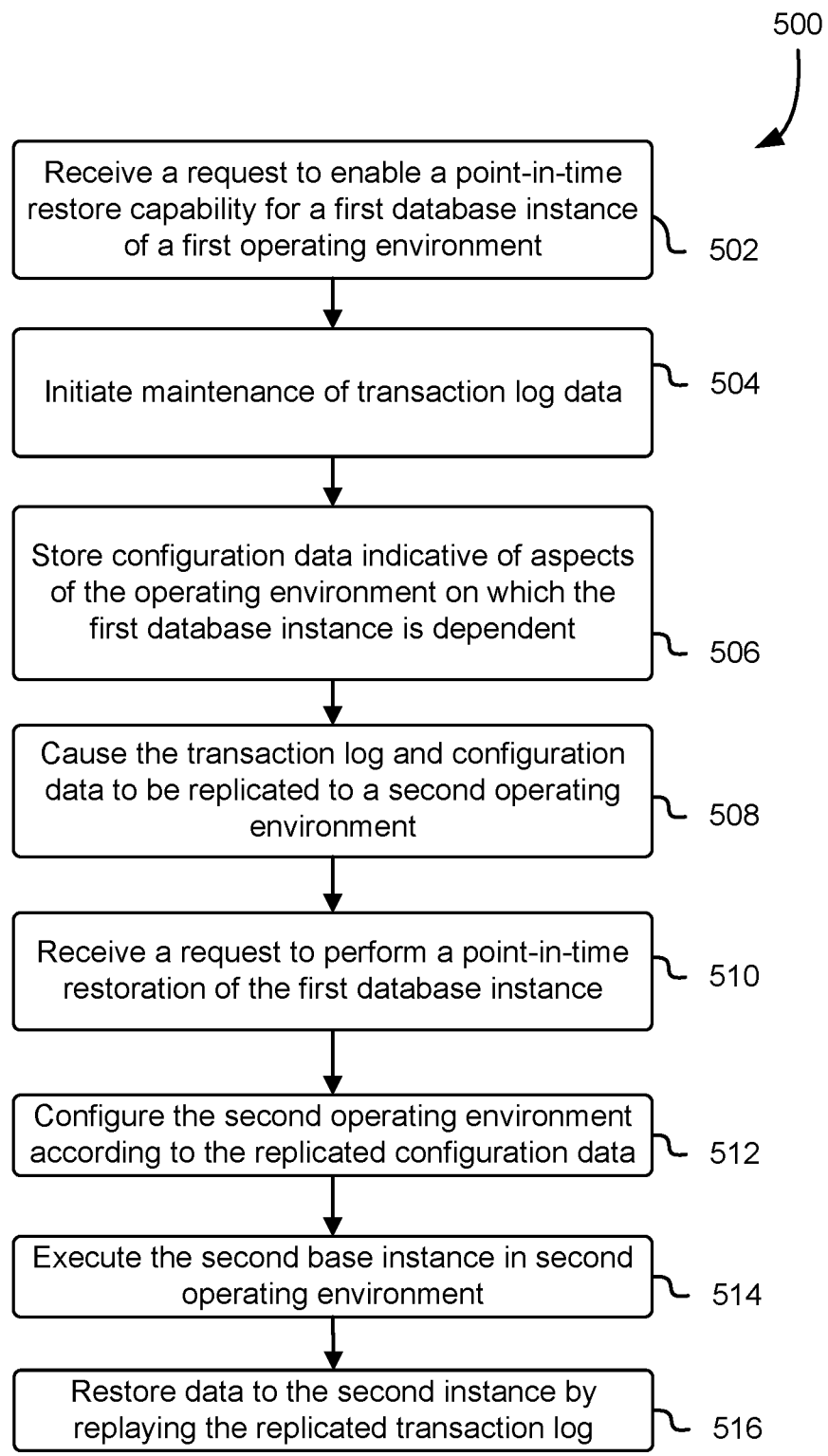
FIG. 5 is a flow diagram illustrating an example process for enabling and performing a point-in-time database restoration, in accordance with an embodiment.

FIG. 5 is a flow diagram illustrating an example process 500 for enabling and performing a point-in-time database restoration, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 500 may be performed by a distributed system, such as the distributed system 100 depicted in FIG. 1. In some embodiments, the depicted steps are performed or initiated by a control plane of the distributed system 100, such as the control plane 106a depicted in FIG. 1.

At 502, the system receives a request to enable a point-in-time restoration capability for a first database instance of a first operating environment. The request may be initiated in a variety of ways. In some instances, it is originated by a user interacting with a user interface. For example, a user might interact with a web-based interface provided by a web server, such as by the web server depicted in FIG. 6, and then received by a control plane. In other instances, a programmatic interface is used to send a request to a control plane. In other instances, a monitoring process or diagnostic process determines that a restoration should be initiated, and sends a request to restore the database instance to a control plane.

Point-in-time restoration refers to the ability to recreate a first database instance such that the data and operation of the restored database is equivalent to what it was for the original database instance as of the restoration time. Accordingly, in various embodiments, point-in-time restoration may include not only restoration of the data previously stored in another database, but restoration of additional configuration settings. These configuration settings may include database settings, as well as other settings external to the database. The external settings may include network configurations, virtual machine configurations, accounts, credentials, and so forth.

At 504, the system initiates maintenance of transaction data. In an embodiment, a control plane in the first operating environment begins intermittent copying of transactions log data from a location in the first operating environment to a replicated data store. In this step, maintenance refers to ensuring that relevant transaction data is copied, on an ongoing basis, to the replicated storage location in the primary database instance's operating environment.

At 506, the system stores configuration data indicative of aspects of the first operating environment on which the first database instance is dependent. In an embodiment, a control plane in the first operating environment monitors and records information describing changes to the operating environment that are determined to be related to the operating of the database. This may, for example, be done by a classification or categorization process which identifies settings which are relevant to the operation of a database instance from those that are not. In some cases and embodiments, metadata may be used to indicate which settings are relevant to the database's operation. There may also be settings which are not intended to be applied to the new environment, or which are adapted when applied to the new environment. One example is account settings, in cases where a different account is intended to be used in the new environment.

In a further aspect, configuration data is stored and maintained on an on-going basis. In this step, maintenance of the configuration data refers to ensuring that relevant changes to configuration are recorded or otherwise preserved, on an ongoing basis, to the replicated storage location in the primary database instance's operating environment.

In a further aspect, records of configuration changes are stored so that they can be accessed and applied to a target operating environment in the same order as the changes were originally applied to the source operating environment. The records may also include an indication of when each change occurred. When a point-in-time restoration is performed, changes leading up to the indicated time of the restoration can be applied to the target operating environment, while changes subsequent to that time can be skipped.

At 508, the distributed system causes the transaction data and configuration data to be replicated a second operating environment. Replication of a unit of data refers to the creation of a copy of the unit of data in another location. Accordingly, step 508 refers to the distributed system causing transaction data and configuration data to be copied to another location. In particular, in an embodiment the system causes the log data and configuration data to be stored by a storage service configured to perform the replication. The service replicates the data by transmitting the data over a network connecting the first and second operating environments, and causing the data to be stored on a storage device hosted in the second operating environment. Interaction with the storage service is managed by the control planes of the respective operating environments.

In an embodiment, replication of the transaction data and configuration data is ongoing. For example, in cases and embodiments the control plane of a first operating environment might semi-continuously monitor the first operating environment for configuration changes. Should a change occur, the control plane might then store a record the change and cause the record to be replicated to another region. This process might continue indefinitely, so that relevant changes to the configuration of the first operating environment can be carried over to the second operating environment, should the database instance be restored to the second operating environment. Likewise, transaction data can be semi-continuously stored in the first operating environment and then replicated to the second operating environment.

At 510, the distributed system receives a request to perform a point-in-time restoration of the first database instance. A control plane in the target operating environment may receive the request. The request may comprise information usable to identify the particular database instance that is to be restored. For example, in an embodiment the request includes an identifier of a client account associated with a database instance, and an identifier of the database instance. Other information that might be included in the request are indicators of the source and target operating environments, information identifying a user account or user credentials associated with the source environment, and information identifying a user account or user credentials associated with the target environment.

At 512, the distributed system configures the second operating environment according to the replicated configuration data. In an embodiment, the control plane in the second operating environment retrieves the replicated configuration data from storage and applies it. For example, the control plane in the second operating environment can make a configuration change previously made by the control plane of the first operating environment. Configuration changes made to the first operating environment, subsequent to the enablement of the restoration capability, are applied to the second operating environment. In some cases, the point-in-time restoration may be for a time other than the current time. If that is the case, changes up to the indicated time can be applied, while changes subsequent to the indicated time can be skipped.

This step may include or be preceded by various additional steps and operations, such as allocating computing devices and virtual machines, applying images and snapshots, installing application programs, and so forth.

At 514, the distributed system executes the second database instance in the second operating environment. The instance may be launched on a computing device or virtual machine allocated for the purpose of executing the restored instance. The client account may begin accruing the cost of operating the restored instance at this point or subsequently (e.g., after all data has been restored by replaying the transaction data). After being initially executed, the instance may possess some of the data managed by the original instance, if that data was included in a database snapshot, virtual machine image, and so forth. However, any transactions not captured in a snapshot or image of the database will not be present until the transaction data is replayed.

At 516, the distributed system restores data to the second database instance by replaying the replicated transaction data. In an embodiment, the control plane in the second operating environment retrieves replicated transaction data from a storage service, and causes the transaction data to be replayed to the new database instance using a facility of the database. For example, database management systems may comprise facilities for processing replicated transaction data and performing the transactions represented by the transaction data. The data maintained by the original database instance is restored to the indicated point in time by replaying transaction log entries up to the indicated point. The control plane may issue instructions to the database to utilize these facilities, and provide a location at which the database instance can access the replicated transaction data.

In an embodiment, the distributed system restores selected data to the second database instance. In addition to specifying a point-in-time for the restoration, an administrator might specify filter criteria indicating which transactions should be replayed. For example, an administrator might specify that transaction related to a particular table, and only those related to that particular table, should be replayed. A control plane might filter the transactions it replays based on the provided criteria.

In an embodiment, the restoration process depicted in FIG. 5 may be applied multiple times, in order to restore several instances of the same database instance. For example, following a crash of a primary database instance, the depicted procedure might be used to create a second operating environment and database corresponding to a time the original database instance was known to be stable. The procedure might also be used to create an additional operating environment corresponding to the time the original database instance crashed, so that it might be used to diagnose the cause of the crash.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608, a control plane 609, and a data store 610. It should be understood that there can be several application servers, control planes, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

In an embodiment, the control plane 609 performs operations to coordinate the activities and operation of components within the system 600. The control plane may comprise a computing device with at least one processor, one or more non-transitory memories, and instructions that, in response to being executed, perform operations of a control plane as described herein. The control plane 609 may further comprise one or more network interfaces for communicating with the web server 606, application server 608, and data store 610.

The control plane 609, in various embodiments, is configured to have access to information not accessible to the web server 606 and/or application server 608. This information may include aspects of user information 616, such as credentials, certificates, account and billing information, system configuration data, and so forth.

The control plane 609, in various embodiments, manages the allocation and configuration of the application server(s) 608 and virtual machines 611. The virtual machines 611 operate on the application server(s) 608. In various embodiments, when a computing resource, such as a database instance, is requested within an operating environment, the control plane 609 identifies an application server 608 with sufficient available capacity and assigns it to execute a virtual machine. The control plane 609 then configures the virtual machine, including performing steps to ensure that software (such as software for a database instance) is installed.

In various embodiments, the control plane 609 can perform operations to configure communications networks. For example, the control plane 609 can configure communications between the web server 606 and application server(s) 608. The control plane 609 may also configure routers, gateways, and other devices in order to provide and secure communications between the web server 606, application server(s) 608, and client device 602.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing data 612 and user information 616, which are used to serve content for the production side. The data store also is shown to include a mechanism for storing operations data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto and the application server 608 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network. These non-virtual devices operate on physical computing devices, such as the depicted application servers.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   a memory that stores computer-executable instructions that, in response to being executed by the at least one processor, cause the system to:
      in response to a request to enable a point-in-time restore capability for a first virtual database instance of a first operating environment, copy a transaction log of the first virtual database instance to a storage location in the first operating environment, the first virtual database instance executing on a first virtual machine, the transaction log comprising a record of a plurality of operations requested to be performed by the first virtual database instance including respective time stamps associated with respective operations of the plurality of operations, the respective time stamps indicating a time when each respective operation was requested to be performed;
      store, in the first operating environment, configuration data indicative of aspects of the first operating environment on which the first virtual database instance is dependent, wherein at least one of the aspects of the operating environment is external to the database;
      replicate the transaction log and configuration data to a second operating environment, the configuration data usable to provision a second virtual database instance in the second operating environment and including at least a database schema; and
      after failure of the first virtual database instance of the first operating environment and while the first operating environment is unavailable:
         in response to a request to instantiate a replica of the first virtual database instance, configure the second operating environment to include aspects of the first operating environment on which the first virtual database instance was dependent, based at least in part on the configuration data replicated to the second operating environment;
         execute the second virtual database instance in the second operating environment, the second virtual database instance configured to include the aspects of the first operating environment on which the first virtual database instance was dependent; and
         restore data to the second virtual database instance based at least in part on:
            the transaction log replicated to the second operating environment, and
            a plurality of time-ordered transactions performed by the first virtual database instance recorded by the transaction log being replayed to the second virtual database instance to cause the plurality of time-ordered transactions to be respectively performed by the second virtual database instance in chronological order of the plurality of time-ordered transactions to restore the replica of the first virtual database instance by the second database re-creating each respective time-ordered transaction of the plurality of time-ordered transactions in chronological order.

2. The system of claim 1, wherein the computer-executable instructions, in response to execution by the at least one processor, cause the system to:
   initiate metering of capacity utilized to execute the second database instance in response to the request to instantiate the replica.

3. The system of claim 1, wherein replicating the transaction log comprises copying at least a portion of the transaction log to a storage service.

4. The system of claim 1, wherein the first operating environment is in a first geographic region and the second operating environment is in a second geographic region, and wherein a storage service replicates the transaction log and configuration data between the first and second geographic regions.

5. A computer-implemented method, comprising:
   storing, in a first operating environment, a copy of transaction data of a first virtual database instance executing on a first virtual machine;
   storing, in the first operating environment, configuration data indicative of aspects of the first operating environment on which the first virtual database instance is dependent, the aspects comprising at least one setting external to the database instance, the transaction data comprising a record of a plurality of operations requested to be performed by the first virtual database instance including respective time stamps associated with respective operations of the plurality of operations;
   replicating the transaction data and configuration data to a second operating environment, the configuration data usable to provision a second virtual database instance in the second operating environment and including one or more user-defined functions; and responding to a request to instantiate a replica of the first virtual database instance, after failure of the first virtual database instance of the first operating environment and while the first operating environment is unavailable, by at least:
configuring aspects of the second operating environment based at least in part on the replicated configuration data;
executing the second database instance in the second operating environment; and
restoring data to the second database instance based at least in part on:
the replicated transaction data, and
a plurality of ordered transactions performed by the first virtual database instance recorded by the transaction data being replayed to the second database instance in chronological order to cause the plurality of ordered transactions to be performed by the second database instance in chronological order to restore the data to the second database instance.

6. The computer-implemented method of claim 5, further comprising responding to the request to instantiate the replica by at least metering capacity utilized to execute the second database instance.

7. The computer-implemented method of claim 5, wherein configuration changes made to the first operating environment are applied to the second operating environment.

8. The computer-implemented method of claim 5, wherein replicating the transaction data comprises copying the transaction data to a storage service that replicates data between operating environments.

9. The computer-implemented method of claim 5, wherein the first operating environment is in a first geographic region and the second operating environment is in a second geographic region, and wherein a storage service replicates the transaction data and configuration data between a storage device in the first geographic region and a storage device in the second geographic region.

10. The computer-implemented method of claim 5, wherein configuring aspects of the second operating environment comprises setting network settings for a plurality of computing devices.

11. The computer-implemented method of claim 5, wherein configuring aspects of the second operating environment comprises allocating at least one of a computing device or virtual machine on which to instantiate the second database instance.

12. The computer-implemented method of claim 11, wherein configuring aspects of the second operating environment comprises installing executable files of the second database instance on the allocated computing device or virtual machine.

13. The computer-implemented method of claim 5, wherein the transaction data comprises a baseline of a database object.

14. The computer-implemented method of claim 5, wherein the transaction data is replicated between the first and second operating environments in response to a request to enable a point-in-time restore capability.

15. A non-transitory computer-readable storage medium comprising executable instructions that, as a result of being executed by one or more processors of a computer system, cause the computer system to at least:
store, in a first operating environment, a copy of a transaction data of a first virtual database instance, the transaction data comprising a record of a plurality of operations requested to be performed by the first virtual database instance including respective time stamps indicating a time when each respective operation of the plurality of operations was requested to be performed;
store, in the first operating environment, configuration data indicative of aspects of the first operating environment relied on by the first virtual database instance, the configuration data separate from and not including the transaction data;
copy the transaction data and configuration data to a second operating environment, the configuration data usable to provision a second virtual database instance in the second operating environment and including at least configuration settings associated with one or more client applications relying on the first virtual database instance being localized to a particular jurisdiction; and
after failure of the first virtual database instance of the first operating environment and while the first operating environment is unavailable:
respond to a request to restore a version of the first virtual database instance by at least configuring the aspects of the second operating environment, based at least in part on the configuration data retrieved from the second operating environment;
execute the second database instance in the configured second operating environment; and
restore data to the second database instance based at least in part on:
the transaction data retrieved from the second operating environment, and
a plurality of transactions performed by the first virtual database instance recorded by the transaction data being replayed in chronological order to the second database instance to cause the plurality of transactions to be performed in chronological order by the second database instance to restore the data to the second database instance.

16. The non-transitory computer-readable storage medium of claim 15, comprising further instructions that, as a result of being executed by the one or more processors, cause the computer system to at least initiate, in response to a request to instantiate the version of the first virtual database instance, metering of capacity utilized to execute the second database instance.

17. The non-transitory computer-readable storage medium of claim 15, wherein the second database instance is restored to a first point-in-time, and an additional database instance is restored in an additional operating environment, based on the configuration and transaction data, to an additional point-in-time.

18. The non-transitory computer-readable storage medium of claim 15, wherein configuring aspects of the second operating environment comprises setting network settings.

19. The non-transitory computer-readable storage medium of claim 15, wherein configuring aspects of the second operating environment comprises allocating at least one of a computing device or virtual machine on which to instantiate the second database instance.

20. The non-transitory computer-readable storage medium of claim 15, wherein the transaction data is replicated between the first and second operating environments in response to a request to enable a point-in-time restore capability.

* * * * *